June 22, 1954     S. GOLDEN     2,681,563
APPARATUS FOR OBTAINING INTERIOR BALLISTICS DATA
Filed Dec. 11, 1950
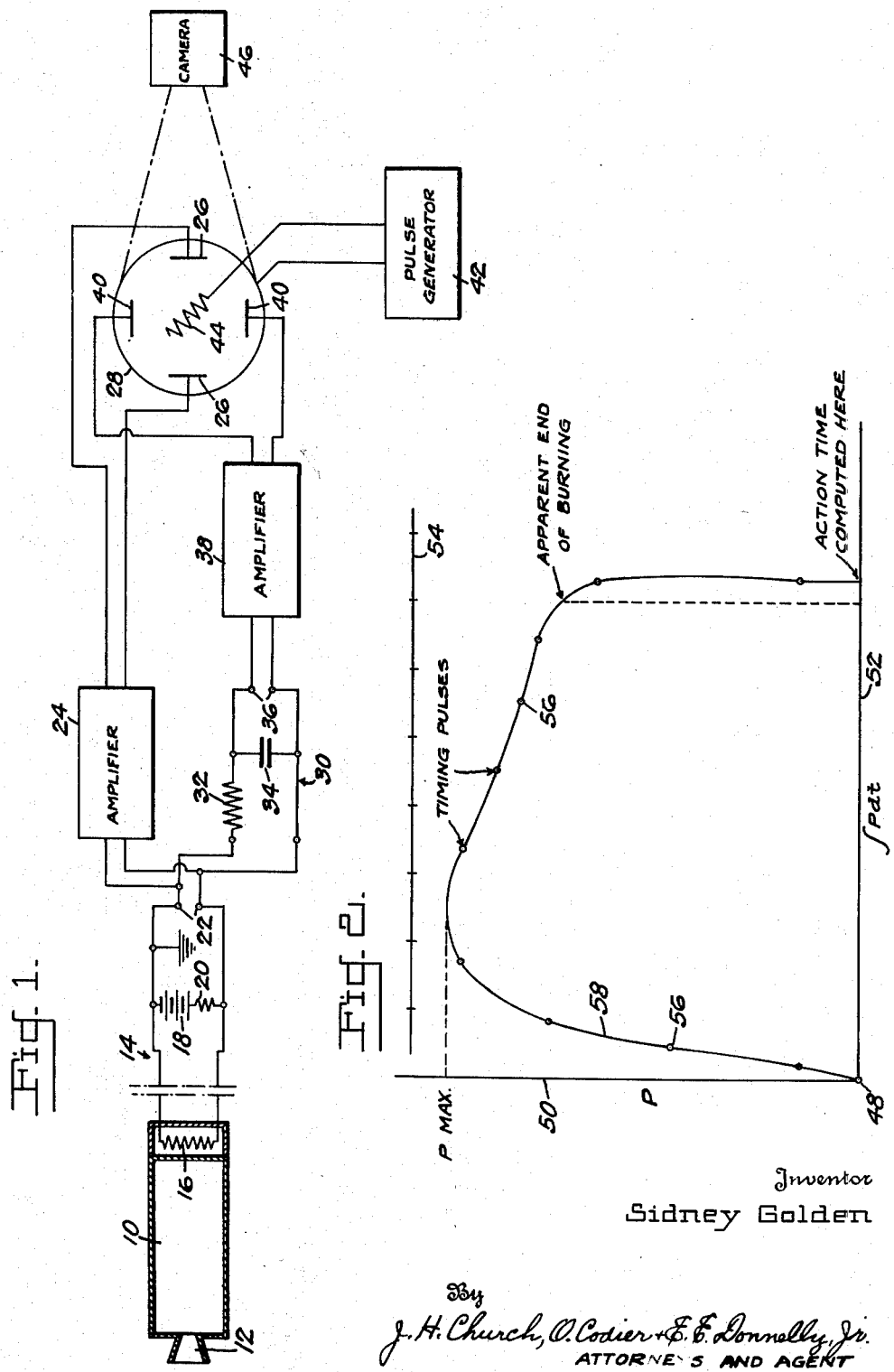

Patented June 22, 1954

2,681,563

UNITED STATES PATENT OFFICE 2,681,563

APPARATUS FOR OBTAINING INTERIOR BALLISTICS DATA

Sidney Golden, Forest Hills, N. Y., assignor to the United States of America as represented by the Secretary of the Army Application December 11, 1950, Serial No. 200,210

2 Claims. (Cl. 73—35)

This invention relates to apparatus for obtaining interior ballistics data with respect to the burning of ordnance propellants within chambers, and relates more particularly to apparatus and methods for obtaining a combined record of pressures, pressures integrated with respect to time, and time during the burning of an ordnance propellant charge.

Heretofore, the study of interior ballistics has included the recording of the pressures within a propellant chamber with respect to the elapsed time of burning of the propellant. Such records have been obtained as a series of pictures on photographic paper or film mounted on a rotating drum. The pressure-time curves thus obtained have constituted primary data for interior ballistics work. Values useful in the study of interior ballistics include maximum pressure, average pressure, pressure integrated with respect to time, apparent burning time, and action time. These values have been obtained from the above-mentioned pressure-time curves by linear measurements and by integration with the use of a planimeter.

In order to give detailed consideration to the interior ballistics of particular ordnance, it is desirable to obtain a combined record of pressures, integrated pressure and time on a stationary photographic plate, film or paper. All the values noted above may then be determined by inspection and measurements of a single record. All the desired values may be quickly noted from the combined record by simple linear measurements and a minimum of computations.

It is therefore the object of this invention to provide an apparatus for obtaining a combined record indicating the pressures, the pressure integrated with respect to time and the time of burning of an ordnance propellant.

It is the further object of this invention to provide an apparatus for obtaining a single photographic record of interior ballistics data relating to the burning of ordnance propellants.

It is a further object of this invention to provide an electronic apparatus which permits the visual observation of the pressures, pressures integrated, with respect to time and the time of a propellant burning process in order that erratic performance may be immediately noted.

It is another object of this invention to provide an improved method of obtaining interior ballistics data including pressure integrated with respect to time.

Other objects and advantages of the invention will be readily apparent from the following description of the accompanying drawings in which:

Fig. 1 is a diagram of a preferred form of apparatus according to the present invention.

Fig. 2 is an enlarged diagrammatic view of a combined record of interior ballistics data of the general type obtained by the method and apparatus of the invention.

With reference to Fig. 1 for purposes of illustration, numeral 10 indicates a chamber within which the propellant charge is burned. The chamber 10 may be the motor of rocket type ordnance provided with a nozzle 12 for the escape of combustion gases, or it may be the closed propellant chamber of a gun. Associated with the chamber 10 is a strain gage measuring circuit, indicated generally at 14, which comprises in its simplest form a resistance 16, a battery 18, and a fixed resistance 20. Resistance 16 is mounted so that its resistance to current from battery 18 will vary with changes in pressure within chamber 10. The potential appearing at terminals 22 has therefore a magnitude which is a function of the pressures produced by burning the propellant charge within chamber 10. This potential resulting at terminals 22 is amplified in a suitable amplifier 24 and then applied to the vertically deflecting plates 26 of a cathode ray oscilloscope 28. The potential across terminals 22 is also connected to an integrating circuit 30, a suitable form of which is shown as comprising a resistance 32 and a condenser 34. The potential at output terminals 36 of the integrating circuit 30 will have a magnitude which is a function of the pressures within chamber 10 integrated with respect to time. The potential at terminals 36 is connected to a suitable amplifier 38 and thence to the horizontally deflecting plates 40 of the oscilloscope 28. The amplifiers 24 and 38 and the cathode ray oscilloscope 28 may be of conventional character, equipped with the usual control and adjustment devices. A timing pulse generator 42 is connected to the grid 44 of oscilloscope 28 to periodically vary the intensity of the cathode ray produced. The pulse generator 42 may also be of conventional character and may include a tuning fork oscillator to control the generation of pulses at a desired rate, such as at intervals of 0.01 second. The oscilloscope 28 is equipped with the usual screen on which the deflections of the ray may be observed and/or photographically recorded by a suitable camera 46.

The method of operation of the apparatus illustrated will now be described. The amplifiers 24 and 38 are adjusted to locate the cathode ray of oscilloscope 28 at a desired zero or point of origin, for example as shown at 48 in Fig. 2. Where the interior ballistics data is to be photographically recorded, the camera shutter is opened while amplifiers 24 and 38 are manipulated to produce a vertical trace line 50 and a horizontal trace line 52 on the oscilloscope screen to record vertical and horizontal axes on the film record. Amplifier 24 is then manipulated to produce a horizontal trace 54 at a known pressure, such as 10,000 pounds per square inch. This calibration is effected by applying a known potential corresponding to a known pressure to the vertically deflecting plates 26 of the oscilloscope, and may be done for more than one pressure. The apparatus is then ready to indicate and/or record the pressure, integrated pressure and time of the burning of a propellant charge in the chamber 10. The propellant charge is ignited by conventional ignition means. As the pressure within chamber 10 rises, the cathode ray of oscilloscope 28 moves upward from the point of origin 48. The vertical distance measured on axis 50 indicates the pressure within chamber 10 at any given instant. The horizontal distance measured on axis 52 indicates integrated pressure with respect to time at any given instant. The dots or spots 56 along the pressure-integrated pressure curve 58 indicate the passage of known units of time after the ignition of the propellant charge. Hence the number of spots 56 from the point of origin 48 to the apparent end of burning indicates the apparent burning time. The maximum pressure produced during burning is indicated by the maximum pressure ordinate of the curve 58 measured on the vertical axis 50. The average pressure from the beginning of the pressure rise to any point during the burning of the charge may be determined by dividing the integrated pressure at that point by the elapsed time from the point of origin 48 to the given point. The average rate of change of pressure with respect to time at a given point may be determined by finding the change in pressure between two timing impulses 56 and dividing by the interval of time corresponding to the timing impulses. The instantaneous value of the rate of change of pressure with respect to time may be determined by measuring the slope of the curve 58 at the point and multiplying this quantity by the pressure at that point.

The method and apparatus disclosed herein for obtaining interior ballistics data has the following advantages. The most pertinent information dealing with ballistic performance is obtained with linear measurements of a single record. No synchronism of the camera taking the record of the event is necessary since the sweep of the cathode ray on the oscilloscope screen depends on the integrated pressure which remains zero until the burning of the propellant begins. Stationary film recording cameras may be used, eliminating the need for expensive drum cameras with unduly long records for developing and handling. By visually observing the oscilloscope during the burning of the propellant charge, the operator can see the pressure-integrated pressure curve traced out on the screen and can detect erratic performance by the time the burning is completed. Since a stationary recording film is used, auxiliary information such as the round number, ignition delay, and the like may readily be recorded simultaneously on the film record.

Other advantages and numerous modifications of this invention will be readily apparent to those skilled in the art. The bounds of my invention are defined by the spirit and scope of the following claims.

I claim:

1. In an apparatus for obtaining a combined pressure, pressure integrated with respect to time, and time record of conditions during the burning of an ordnance propellant within a chamber, the combination comprising a cathode ray oscilloscope having a pair of vertically and a pair of horizontally deflecting plates, means for deriving an electrical potential having a magnitude which is a function of the pressures within said chamber, means for applying said potential to one of said pairs of deflecting plates, means for integrating said potential with respect to time and deriving a second electrical potential having a magnitude which is a function of said pressures integrated with respect to time, means for applying said latter potential to the other of said pairs of deflecting plates, and means for periodically varying the intensity of the cathode ray at predetermined time intervals.

2. In an apparatus for obtaining a photographic record of the pressure, pressure integrated with respect to time, and time of conditions during the burning of an ordnance propellant within a chamber, the combination comprising a cathode ray oscilloscope having a pair of vertically and a pair of horizontally deflecting plates, means for deriving an electrical potential having a magnitude which is a function of the pressures within said chamber, means for applying said potential to one of said pairs of deflecting plates, means for integrating said potential with respect to time and deriving a second potential having a magnitude which is a function of said pressures integrated with respect to time, means for applying said latter potential to the other of said pairs of deflecting plates, means for periodically varying the intensity of the cathode ray at predetermined time intervals, and means for photographically recording the trace of the cathode ray across the screen of said oscilloscope.

References Cited in the file of this patent

UNITED STATES PATENTS

| Number | Name | Date |
| --- | --- | --- |
| 2,113,376 | Janco | Apr. 5, 1938 |
| 2,133,437 | Dodds | Oct. 18, 1938 |
| 2,225,381 | Van Dijck | Dec. 17, 1940 |
| 2,251,973 | Beale et al. | Aug. 12, 1941 |
| 2,448,322 | Piety | Aug. 31, 1948 |
| 2,509,210 | Clark | May 30, 1950 |
| 2,511,178 | Roters | June 13, 1950 |
| 2,519,421 | Weiss | Aug. 22, 1950 |
| 2,563,899 | Wiancko | Aug. 14, 1951 |